United States Patent [19]

Jennings et al.

[11] Patent Number: 4,482,645

[45] Date of Patent: Nov. 13, 1984

[54] METHOD OF MAKING AN IRON OXIDECHROMIUM OXIDE CATALYST

[75] Inventors: James R. Jennings, Yarm, England; George N. Pessimisis, Westchester, Ill.

[73] Assignees: Imperial Chemical Industries Limited, London, England; Katalco Corporation, Oak Brook, Ill.

[21] Appl. No.: 519,151

[22] Filed: Aug. 1, 1983

Related U.S. Application Data

[62] Division of Ser. No. 380,979, May 24, 1983.

[51] Int. Cl.$^3$ .............................................. B01J 23/86
[52] U.S. Cl. ..................................................... 502/316
[58] Field of Search ................................ 502/316, 306

[56] References Cited

U.S. PATENT DOCUMENTS 1,954,415  4/1934  Kipper ................................ 423/395
3,552,917  1/1971  Weiss .................................... 423/57
4,305,846  12/1981  Jennings ............................. 502/316

FOREIGN PATENT DOCUMENTS 0019989  10/1980  European Pat. Off. .
1252176  11/1971  United Kingdom .
1259381  1/1972  United Kingdom .

Primary Examiner—W. J. Shine
Attorney, Agent, or Firm—John G. Premo; Robert A. Miller; Donald G. Epple

[57] ABSTRACT

The Abstract of the Invention is a method of making a solution of the nitrates of iron and chromium from a spent catalyst containing oxides of iron and chromium, which method comprises:

(a) dissolving the catalyst in sulphuric acid;
(b) reacting the resulting sulphates solution with a source of nitrate ions and of cations of which the sulphate is of low solubility, whereby to precipitate such sulphate;
(c) separating the sulphate, whereby to give a nitrates solution of low sulphate content.

5 Claims, No Drawings

METHOD OF MAKING AN IRON OXIDE CHROMIUM OXIDE CATALYST

This application is a division of co-pending Ser. No. 380,979, filed May 24, 1983.

This invention relates to solution preparation, in particular of the nitrates of iron and chromium, the production of a catalyst containing iron oxide and chromium oxide from such a solution, and to an oxide composition reducible to a shift catalyst.

The iron-chrome shift catalyst when in use contains a mixture of divalent and trivalent iron oxides, in combination with trivalent chromium oxide, and is usually brought into its active form by reducing an oxide precursor composition in a higher valency state. Some oxide compositions used in the past have contained hexavalent chromium, but this is undesirable because of toxicity and of the large evolution during reduction. It has, therefore, been proposed to reduce the hexavalent chromium to trivalent chromium during production of the oxide composition, for example, by reaction with a divalent iron compound such as ferrous carbonate. This has the drawback that the only inexpensive iron compound from which the ferrous carbonate could be made is ferrous sulphate, so that steps have to be taken to avoid contamination of the oxide composition by sulfur or to prolong the reduction treatment until sulfur compounds have been driven out. Among the methods proposed for making low-sulfur oxide compositions are that described in U.K. Pat. No. 1,259,381, which describes an initial stage of precipitation of ferrous oxalate, and that described in U.K. Pat. No. 1,252,176, which describes thermal decomposition of nitrates. These methods are expensive, especially that of U.K. Pat. No. 1,252,176 because of the cost of the chromium nitrate and, accordingly, in European published application 19,989 (corresponding to U.S. Pat. No. 4,305,846), we describe a method of making a solution of the nitrates of iron and chromium by reacting metallic iron or an alloy thereof with nitric acid in the presence of one or more hexavalent chromium compounds. Thereafter, the nitrates are converted to an intimate mixture of the oxides, preferably by way of co-precipitating them with an alkaline reactant.

Since iron-chrome shift catalyst has to be replaced after a few years' use, it would be very convenient if it could be converted to the mixed nitrate solution and, thus, to fresh catalyst by the method described in European application 19,989. However, we find that spent iron-chrome shift catalyst, at least when so made, does not dissolve in nitric acid at a practicable rate. This is contrary to what is disclosed in USSR Pat. No. 471,112.

We have now discovered that the nitrates solution can be made from spent catalyst by the steps:
(a) dissolving the catalyst in sulphuric acid;
(b) reacting the resulting sulphates solution with a source of nitrate ions and of cations of which the sulphate is of low solubility, whereby to precipitate such sulphate;
(c) separating the sulphate, whereby to give a nitrates solution of low sulphate content.

For Step (a) the quantity of sulphuric acid is preferably sufficient to dissolve the catalyst completely, in order to avoid changing the ratio of iron to chromium. Incomplete dissolution may, on occasion, have to be accepted; however, for example, when the catalyst has suffered accidental overheating or has been used at unusually high temperatures, as in reducing gas production. In any event, however, it is advisable to check and, if necessary, adjust the iron to chromium ratio of the solution. The concentration of the sulphuric acid is conveniently in the range 10–80, especially 20–40% w/w, at the start of dissolution.

To facilitate dissolution the spent catalyst is one that has, in the course of discharge by the user, been cooled carefully, for example, in steam-diluted air or in a strong current of ambient air or otherwise, so as to avoid increasing its temperature above 300° C. By such treatment, the catalyst is kept at approximately the $Fe_3O_4$ oxidation level and sintering is avoided.

If desired, further iron and/or chromium can be introduced into the solution. For example, an iron salt can be added, such as a sulphate. If excess sulphuric acid has been used, it can be conveniently neutralized with ferrous carbonate or reacted with metallic iron: metallic iron may assist by reducing trivalent iron oxide. To balance the added iron, an addition of a chromium compound can be made, preferably in hexavalent form to oxidize ferrous iron to ferric iron. Other steps, such as air-blowing, can be applied at this stage to effect the oxidation. If metallic iron is dissolved, suitable precautions should be taken to deal safely with any evolved hydrogen.

Step (b) is preferably carried out by double decomposition of the sulphates solution with calcium nitrate. This reactant can be made separately or in situ mixing nitric acid with the sulphates solution and adding a calcium compound (conveniently the hydroxide or carbonate) to the mixture. The resulting calcium sulphate precipitate is separated and washed and can then be disposed of to a plaster manufacturer or as landfill. The resulting nitrates solution is saturated with calcium sulphate, but the solubility thereof is low (under 0.25 g per 100 ml, with only slight variation with temperature) and may be too little to contaminate the catalyst to be made. If more complete sulphate removal is required, the solution can be reacted with a cation forming a less-soluble sulphate, for example, the salts of strontium, barium or lead or an anion exchange resin.

In order to limit the sulphate content of the solution further, the sulphuric acid dissolution can be applied not to the whole of the spent catalyst but to that part of it which is not soluble or not dissolved in convenient conditions by nitric acid. Thus, the invention provides a method of making a solution of the nitrates of iron and chromium from a spent iron-chrome shift catalyst by the steps of:
(a) dissolving the catalyst incompletely in nitric acid;
(b) separating the resulting solution from the undissolved residue;
(c) dissolving the residue in sulphuric acid;
(d) reacting the resulting sulphates solution with a source of nitrate ions and of cations of which the sulphate is of low solubility, whereby to precipitate such sulphate;
(e) separating the sulphate, whereby to give a nitrates solution of low sulphate content.

Conveniently, the solutions produced in Steps (b) and (e) can then be mixed. If Step (a) proceeds to the extent of over 80% as is readily possible using the process of U.S. application Ser. No. 380,980, filed May 24, 1982, now U.S. Pat. No. 4,410,443, then the sulphate content of the mixture can be very low. Moreover, it can be economic to use in Step (d) a reagent producing a sulphate less soluble than calcium sulphate.

The spent catalyst may contain various impurities deposted on it during use. If these include alkali metal compounds, these dissolve in the sulphuric acid, will remain in the nitrates solution and will be discarded with the filtrate after the co-precipitation. If the impurities include silica, this will be removed with the precipitated sulphate. If the spent catalyst contains sulfur, this will be expelled as $H_2S$ during dissolution in sulphuric acid.

The details of the catalyst and the subsequent steps in its production are as described in European application 19,989, the relevant passages from which are now reproduced.

Usually, such a catalyst is used as a fixed bed, hence the method then involves the further step of forming the oxides into pieces, which for this type of catalyst suitably have all their dimensions in the range 2 to 20 mm, with no dimension of a single piece more than 5 times another. The pieces are made suitably by compression of the oxide composition with a lubricant, such as graphite, into cylinders having flat, indented, or protrusioned end surfaces. Alternatively, they can be made by extrusion or granulation, of a wet composition, possibly with a binder material. To give an active catalyst, the oxide composition is reduced by means of a mixture of steam and hydrogen or a compound reactible with steam to produce hydrogen in the conditions of reduction, which usually include a temperature in the range 150°–400° C.

The ratio of iron to chromium in the catalyst is typically in the range 20:1 to 6:1 calculated by weight as the sesquioxides. Usually this ratio is attained by controlling the weights of chromium compound and nitric acid used in the original preparation step. Perferably at least 50% of the nitrates are derived from spent catalyst. If a nitrate solution ratio adjustment is made, it is more convenient by adding iron nitrate to a solution containing too much chromium, since externally supplied chromium nitrate is very expensive. A small addition of hexavalent chromium (for example up to 1% of the $Cr_2O_3$ used) may be tolerable if made after the wet stages of catalyst preparation but is best avoided on account of its toxicity and its high reduction exotherm.

If desired, a lead salt may be added to the nitrates in order to take advantage of the effect of lead oxide in the low sulfur catalyst to be produced by the method.

Conversion of the nitrates to an intimate mixture of oxides can be simply by evaporation and calcination if any hexavalent chromium compound has been a chromic acid or anhydride or an ammonium chromate, or if alkali can be tolerated in the oxide composition. However, it is preferred to convert the nitrates to oxides by way of co-precipitating them with an alkaline reactant, such as a carbonate or hydroxide of an alkali metal or ammonium. If desired, they can be co-precipitated as oxalates, and possibly thereafter converted to hydroxides; but this is not necessary. The resulting hydroxides or oxalates are then thermally decomposed to oxides. Co-precipitation with an alkali metal compound is normally followed by thorough washing of the precipitate to decrease its alkali content to under 0.4%, especially under 0.3% w/w calculated as equivalent $Na_2O$.

By the method according to the invention, it is possible to make an oxide composition reducible to a catalyst for the reaction of carbon monoxide with steam to form carbon dioxide and hydrogen, the composition having the following properties:

$Fe_2O_3/Cr_2O_3$ weight ratio in the range 20:1 to 6:1, especially 12:1 to 8:1;

surface area 100–250, especially 120–200 $m^2/g$;

mean pore radius 10–100, especially 15–50, Angstrom units;

loss on ignition at 900° C. over 10, especially 15 to 25% w/w.

The shift reaction over the catalyst made from the oxide composition by reduction is of the high temperature type, that is, at an outlet temperature between 350° and 500° C. The inlet temperature is typically in the range 300°–400° C.

EXAMPLE

Solution Preparation

Sulphuric acid 96.5% w/w (150 ml) was diluted with water (225 ml) and warmed to 225° F. (107° C.). Then 100 g of spent iron-chrome high temperature shift catalyst of the type described in U.S. Pat. No. 4,305,846, and containing 84.7% w/w of iron oxide (calculated as $Fe_2O_3$), 7.71% w/w of $Cr_2O_3$, was added in powder form. The slurry was digested at 225° F. under refluxing conditions for two hours. As a result, complete dissolution was obtained. The solution was diluted with cold water to 700 ml. The resulting solution contained 23.6 grams/liter of $Fe_2O_3$, 2.3 grams/liter as $Cr_2O_3$ and 51.5 grams/liter as sulfate. Into it was stirred a solution of calcium nitrate (442 g anhydrous) in water. The resulting solution was filtered to remove calcium sulfate dihydrate, and the resulting filtrate was adjusted to a volume of 2.0 l. The resulting filtrate was then used to prepare a fresh shift catalyst and is employed in the Example titled "Catalyst Preparation" below.

Catalyst Preparation

A solution at 50° C. of the ferric nitrate and chromium nitrate solution from the above preparation was fed to a stirred solution of sodium carbonate (250 g per liter) at 60° C. until the pH was in the range 7.0–8.5 measured at 25° C. The resulting suspension of the hydroxides of iron and chromium was stirred until no further carbon dioxide was evolved; then washed and dried. The dry oxide composition was found by analysis to contain 68.4% by weight $Fe_2O_3$, 7.42% $Cr_2O_3$, 17.2% CaO, 1.87% of sulfur expressed as $SO_3$, and 0.23% of sodium expressed as $Na_2O$.

Sulfur content of the resultant oxide composition could have been minimized by treating the starting nitrate solution with barium nitrate followed by filtering off precipitated insoluble barium sulfate.

A sample of the oxide composition was milled, mixed with 3% of its weight of graphite, granulated and then compressed into 3.6×5.4 mm squat cylindrical pellets. These pellets are the catalyst precursor as handled in commerce. A sample of pellets was reduced to active form by means of a steam-hydrogen mixture at 300° C. and then tested in the shift reaction. The effluent from the reduction was sulfur-free by the end of reduction. The catalyst had activity in the shift reaction at least equal to that of a commercially available high temperature shift catalyst.

Having thus described our invention, we claim:

1. A method of making an iron-chromium oxide composition having a $Fe_2O_3/Cr_2O_3$ weight ratio of 20:1 to 6:1, a surface area of 100–250 $m^2/g$, a mean pore radius of 10–100 A, and a loss on ignition of over 10 weight percent, said composition convertible by reduction to a catalyst for the high temperature shift process, said method comprising:

A. Dissolving a spent iron oxide-chromium oxide shift catalyst having a $Fe_2O_3/Cr_2O_3$ ratio of 20:1 to 6:1 in nitric acid;

B. Separating the resulting solution of the nitrates of iron and chromium from the nitric acid insoluble residue containing undissolved iron and chromium components;

C. Dissolving the nitric acid insoluble residue of step B in sulphuric acid to obtain a solution of metal sulphates;

D. Reacting the resulting metal sulphate solution with a source of nitrate ions and of cations of which the sulphate is of low solubility so as to prepare a solution of iron and chromium nitrates and an insoluble sulphate precipitate;

E. Separating the insoluble sulphate precipitate from the solution of metal nitrates to give a nitrates solution of iron and chromium low in sulphate content;

F. Combining the solutions of the nitrates of iron and chromium of steps B and E;

G. Reacting the resulting iron and chromium nitrate solution with an alkali metal carbonate to co-precipitate the hydroxides of iron and chromium;

H. Separating the insoluble iron and chromium hydroxide precipitate;

I. Washing the iron and chromium hydroxide precipitate to decrease its alkali metal content to under 0.4% calculated as equivalent $Na_2O$;

J. Drying such precipitate and thermally decomposing the iron and chromium hydroxides to oxides; and then, K. Forming the precipitate into pieces having dimensions in range 2-20 mm, with no dimension of a single piece more than 5 times another.

2. A method of making an iron-chromium oxide composition having a $Fe_2O_3/Cr_2O_3$ weight ratio of 20:1 to 6:1, a surface area of 100-250 m²/g, a mean pore radius of 10-100 A, and a loss on ignition of over 10 weight percent, said composition convertible by reduction to a catalyst for the high temperature shift process, said method comprising:

A. Dissolving a spent iron oxide-chromium oxide shift catalyst having a $Fe_2O_3/Cr_2O_3$ ratio of 20:1 to 6:1 in sulfuric acid;

B. Reacting the resulting iron and chromium sulphate solution with a source of nitrate ions and of cations of which the sulphate is of low solubility, so as to prepare a solution of iron and chromium nitrates and an insoluble sulphate precipitate;

C. Separating the insoluble sulphate residue from the solution of iron and chromium nitrates to give an iron and chromium nitrates solution low in sulphate content;

D. Reacting the resulting iron and chromium nitrates solution with an alkali metal carbonate to co-precipitate the hydroxides of iron and chromium;

E. Separating the insoluble iron and chromium hydroxide precipitate;

F. Washing the iron and chromium hydroxide precipitate to decrease its alkali metal content to under 0.4% calculated as equivalent $Na_2O$;

G. Drying such precipitate and thermally decomposing the iron and chromium hydroxides to oxides; and then, H. Forming the precipitate into pieces having dimensions in range 2-20 mm, with no dimension of a single piece more than 5 times another.

3. The method of claim 1 wherein the source of the nitrate ion in step D is calcium nitrate.

4. The method of claim 2 wherein the source of the nitrate ions in step B is calcium nitrate.

5. The method according to claim 1 or claim 2 wherein a ferrous compound or metallic iron is also dissolved in the sulphuric acid and a hexavalent chromium compound is added to balance the added iron.

* * * * *